(12) United States Patent
Jenkins et al.

(10) Patent No.: US 7,613,641 B1
(45) Date of Patent: Nov. 3, 2009

(54) SYSTEM AND METHOD FOR DEVELOPING A DEFINED PENSION PLAN LOGIC AND FRAMEWORK

(75) Inventors: Cary Porter Jenkins, Powell, OH (US); Price Eugene Jenkins, Powell, OH (US); Robert Randolph Flannery, II, Powell, OH (US); Michael Earl Nelson, Columbus, OH (US)

(73) Assignee: Hartford Fire Insurance Company, Simsbury, CT (US)

( * ) Notice: Subject to any disclaimer, the term of this patent is extended or adjusted under 35 U.S.C. 154(b) by 1161 days.

(21) Appl. No.: 10/152,516

(22) Filed: May 22, 2002

(51) Int. Cl.
*G06Q 40/00* (2006.01)
(52) U.S. Cl. ......................................................... 705/35
(58) Field of Classification Search ........................ None
See application file for complete search history.

(56) References Cited

U.S. PATENT DOCUMENTS

| | | | | |
|---|---|---|---|---|
| 5,819,263 | A * | 10/1998 | Bromley et al. | 707/3 |
| 5,918,217 | A | 6/1999 | Maggioncalda et al. | 705/36 |
| 6,012,043 | A | 1/2000 | Albright et al. | 705/36 |
| 6,014,642 | A | 1/2000 | El-Kadi et al. | 705/36 |
| 6,064,986 | A | 5/2000 | Edelman | 705/36 |
| 6,092,047 | A | 7/2000 | Hyman et al. | 705/4 |
| 6,205,434 | B1 | 3/2001 | Ryan et al. | 705/35 |
| 6,266,648 | B1 | 7/2001 | Baker, III | 705/14 |
| 6,314,415 | B1 | 11/2001 | Mukherjee | 706/47 |
| 2001/0014873 | A1 * | 8/2001 | Henderson et al. | 705/35 |
| 2001/0037276 | A1 * | 11/2001 | Kelly et al. | 705/36 |
| 2002/0019791 | A1 * | 2/2002 | Goss et al. | 705/36 |

* cited by examiner

*Primary Examiner*—Jason M Borlinghaus
(74) *Attorney, Agent, or Firm*—Standley Law Group LLP

(57) ABSTRACT

The present invention is a universal pension administration system that allows multiple companies use the same system for valuation report generation, benefit calculation, database administration, and trust payment direction. Plan Actuaries define a pension plan by answering questions related to the plan. A Developer Actuary uses tools to develop a pension plan framework that defines plan questions and logic and calculations to support the plan definition. A first tool is used to define the logic for pension plan definition, calculation sequencing, and report generation. In the calculation sequencing, rules are defined to refer to spreadsheets in which complex calculations related to the plan are performed. A second tool is used to design discrete calculation objects using a standard client-based spreadsheet. The spreadsheets are sequenced on a server in any manner as dictated by expert system code generated from the calculation-sequencing tool. Plan Participants access an online account to obtain information regarding benefits.

18 Claims, 10 Drawing Sheets

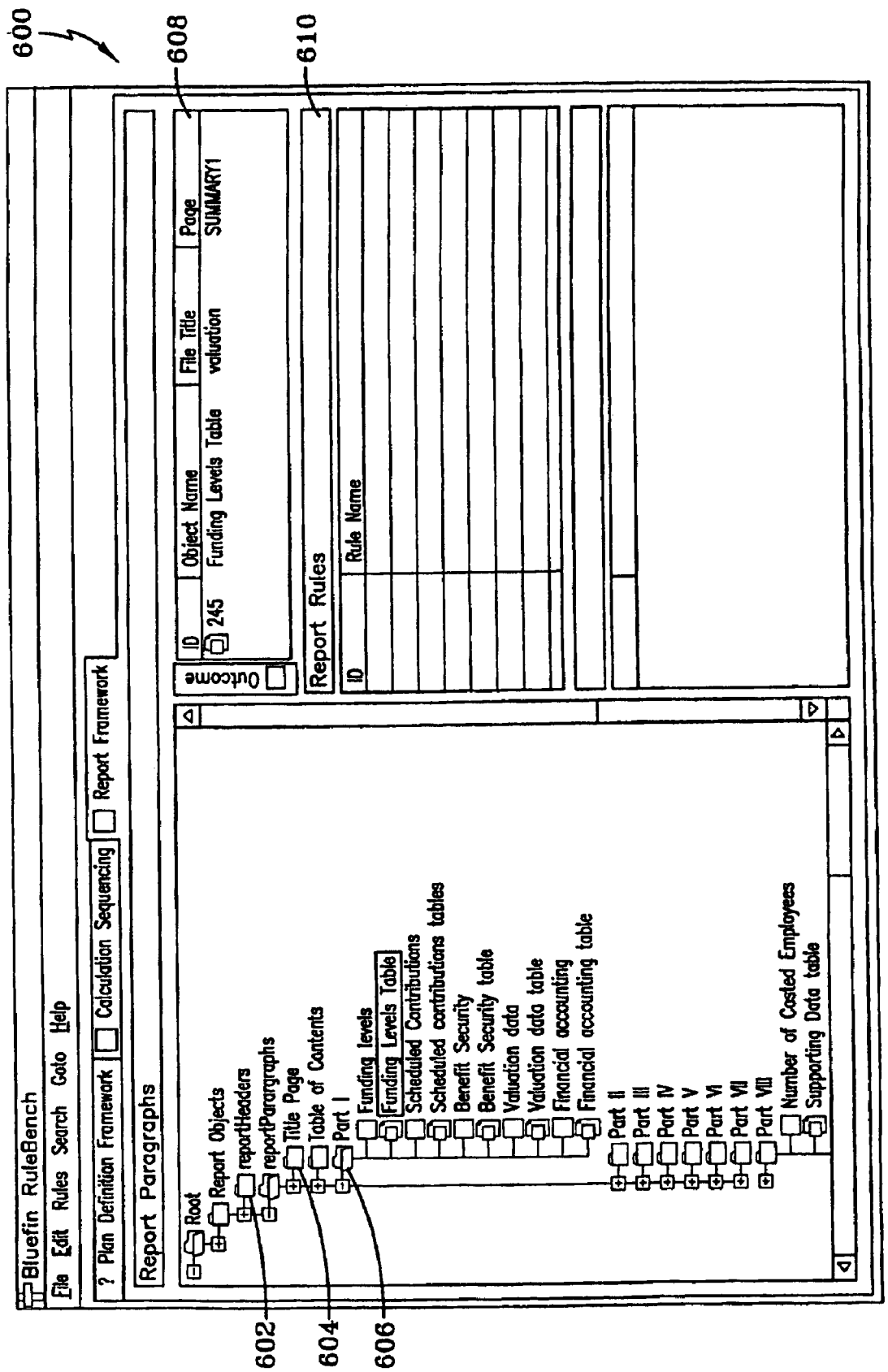

| Administrator Resources | Participant Resources | About Bluefin | Access Account | Logout |

Plan Definition – Interview

[First] [Previous] [Next]

Valuation Set Up

| Question | Input |
|---|---|
| What is the Valuation date? ** Enter the date of the valuation. | 04/03/2002 ◇ |
| What is the first day of the Plan Year? ** for which this valuation applies | 01/01/2002 ◇ |
| Are Actuarial Method changes being measured in this valuation? ** | No ▽ |
| What is the fiscal year end for contributions? ** for determining interest on deductible contribution | 11/15/2001 ◇ |
| Is a Plan Amendment being measured in this valuation? ** | No ▽ |
| Are Plan Assumption changes being measured in this valuation? ** | No ▽ |
| What order will changes be measured? ** | ⊙ No Changes<br>○ Plan Provision change only |

Outline
- Home
  - Valuation Set Up 710, 702, 704, 706, 708, 710, 712

FIG-7

| Participant Resources | Access Account | About Bluefin | Logout |

Benefit Summary – Retirement

Your company provides this pension benefit at no cost to you. The plan is designed to supplement Social Security and your personal savings to provide a secure income for you in retirement. The following estimates assume you continue work in the future earning service at the maximum rate and that your pay increases at the salary increase rate indicated below.

All benefits shown below are payable as a life annuity. This means that a monthly benefit will be paid for your lifetime with the last payment being made in the month of your death. You and your spouse/beneficiary can choose from several other payment options to fit your personal situation. Click "Other Retirement Scenarios" to see these options for the particular retirement scenario you define.

User
SAMPLE USER

User
▷ See a summary of your retirement benefits.
▷ See what your pension benefit provides under different retirement scenarios.

Participant Name: SAMPLE USER         Salary Increase Rate: [ 0% ▽ ]   [ CALCULATE ]

| Benefit Estimates | Monthly Benefit | Date Payable |
|---|---|---|
| • Accured Benefit 04/09/2002 | $834.18 | 01/01/2021 |
| • Early Retirement Benefit (age 55) | $792.81 | 01/01/2011 |
| • Early Retirement Benefit (age 62) | $1,860.24 | 01/01/2018 |
| • Normal Retirement Benefit (age 65) | $2,026.84 | 01/01/2021 |

(go) Othe Retirement Scenarios...

Benefits
☐ Retirement
☐ Disability
☐ Death

| Participant Resources | Access Account | About Bluefin | Logout |
|---|---|---|---|

Benefit Scenario Results – Retirement

Retirement Scenario

| | |
|---|---|
| Name: | Sample User |
| Termination Date: | 12/31/2020 |
| Payment Date: | 01/01/2021 |
| Beneficiary Birthdate: | 01/01/1956 |
| Salary Increase Rate: | 3 |
| Social Security Date: | 01/01/2018 |

Generate Election Forms    REVISE SCENARIO

| Form Of Payment (Monthly) | While Alive | After Death |
|---|---|---|
| With No Lump Sum | | |
| • Life Annuity | $2,437.80 | $0.00 |
| • 10 Years Certain and Life Annuity | $2,316.31 | $2,316.31 |
| • 50% Joint and Survivor Annuity | $2,281.85 | $1,140.93 |
| • 67% Joint and Survivor Annuity | $2,234.20 | $1,489.47 |
| • 75% Joint and Survivor Annuity | $2,211.12 | $1,658.34 |
| • 100% Joint and Survivor Annuity | $2,144.64 | $2,144.64 |
| • Social Security Life Annuity to Social Security Age | $0.00 | $0.00 |

User
SAMPLE USER

User
▷ See a summary of your retirement benefits.
▷ See what your pension benefit provides under different retirement scenarios.
▷ Generate benefit election forms.

Benefits
☐ Retirement

SYSTEM AND METHOD FOR DEVELOPING A DEFINED PENSION PLAN LOGIC AND FRAMEWORK

TECHNICAL FIELD

The present invention is in the field of automated systems and methods for pension administration. More specifically, the present invention relates to a system and method for pension plan administration that universally administers any pension plan from a single system.

BACKGROUND OF THE INVENTION

Pensions have long been one of the primary employment benefits designed to retain employees and help them attain financial security through their retirement years. Under a defined benefit plan, the benefit that an employee receives is normally based on the length of the employee's employment and the wages that he received. The money to support the pensions in a defined benefit plan is generally administered through a trust established by the employer for the benefit of the employees.

Pensions under a defined benefit plan are governed primarily by federal statutory law. Congress passed the Employee Retirement Income Security Act (ERISA) under its Constitutional mandate to regulate interstate commerce. The act was passed in response to the mismanagement of funds in direct benefit plans. All employers who engage in interstate commerce and provide defined benefit plans to their employees must abide by ERISA guidelines.

ERISA is highly complicated and provides detailed regulations for many aspects of defined benefit plans. ERISA requires that employers provide both the Labor Department and their employees with detailed descriptions of the benefits they are to receive. It also outlines which employees must receive a pension if one is offered, and it requires that a percentage of the retirement benefits become vested in the employees after they have worked for a given number of years and/or have reached a given age. ERISA also requires that pension plans provide benefits to an employee's survivors upon his death. Companies that offer pension plans must be prepared to provide this information to their employees (Plan Participants) who retire, leave the company, become disabled, or die. The information must also be available to participants that remain employed.

Employers must adequately fund the program and adhere to fiduciary responsibilities established by the act. ERISA has established the Pension Benefit Guaranty Corporation (PBGC) to insure defined benefit plans. Employers must pay premiums so that their plans are covered by the PBGC. The termination of plans is also extensively regulated.

To encourage employers to provide pension plans that follow Congressionally established guidelines such as ERISA, Congress has authorized tax breaks to employers who follow the guidelines. Title 26 (the Internal Revenue Code) establishes numerous qualifications and requirements in order for an employer to receive special tax treatment. For example, pension plans must be vested and must meet minimum coverage requirements. Adherence to tax code requirements further complicates the administration process.

There are nearly 38,000 private defined benefit pension plans that are expected to provide retirement incomes for more than 43 million American workers. Administration of these pension plans is complex, cumbersome, and often expensive. They require oversight by certified actuaries. Pension plan administration and reporting processes vary widely across organizations and cost some organizations as much as $1,500 per employee per year. The high cost of pension plan administration and reporting is attributable in part to the continuously evolving regulatory framework that administrators are required to follow. The federal statutes, rules, and regulations that apply to the plans are enforced by the IRS and other agencies. Defined benefit pension plans must comply with definition requirements as well as reporting requirements established by the IRS, Department of Labor, and the PBGC. Each year, companies with defined benefit pension plans are required to produce a valuation report that is reviewed by an actuary who certifies that the plan is adequately funded. Valuation reports are typically 50-60 pages in length and contain the results of an immense number of calculations. Employer data, relevant IRS code sections, and actuarial assumptions and methods are used to determine pension contribution requirements and financial reporting information. This information may have a significant impact on a company's fiscal planning.

Pension mathematics that are required to determine whether a plan is adequately funded are extremely complex. Ten of thousands of discrete formulas may be needed to complete the necessary calculations for a plan. In addition, there is a tremendous amount of interdependency between the formulas. Attempts to hardcode the mathematics into computer systems often fail due to high error rates in translating the formulas into source code.

Compliance with current laws is critical to the success of defined benefit pension plans. Pension plans that fail to meet the requirements imposed by the IRS, Department of Labor, and PBGC may be disqualified. Liability for non-compliance can be high. The plan administrator may be required to take corrective actions to bring the plan into compliance. In addition, the administrator of the non-compliant plan may be sued by employees or clients for failure to administer a compliant plan and may be required to pay monetary damages.

Pension plan administrators need to be able to monitor for ongoing compliance with the complex regulatory framework that has been established by the IRS, Department of Labor, and PBGC. Pension plan administrators also have a need for tools that address complex plan scenarios and frequent regulatory changes. Solutions that have been developed to today are customized for a particular pension plan. No solution available today incorporates the universe of highly complex pension plan provisions and actuarial logic into a single system.

SUMMARY OF THE INVENTION

The present invention is a universal pension administration system that allows multiple companies use the same system for valuation report generation, benefit calculation, database administration, and trust payment direction. Users of the present invention include the following:

Plan Actuary—An actuary hired by a company to oversee the management and administration of the pension plan. The Plan Actuary is typically responsible for defining the pension plan, running the valuation report, and certifying it.

Plan Administrator—An employee (typically working in a HR department) of a company that sponsors a pension plan. The Plan Administrator may run benefit calculations, etc. for other employees and maintains the underlying database.

Plan Participant—An employee of a company and participant of the pension plan.

Developer Actuary—designs the framework of logic and calculations used by the present invention so that Plan Actuaries may define pension plans for their respective companies.

The present invention incorporates tools that allow a Plan Actuary to intuitively define a company's pension plan and thereby automatically generate valuation reports that are compliant with the various federal statutes and regulations. In addition, the Plan Actuary may run benefit calculations for employees. The system is designed so that changes to the plan definition may be made in a single location and affect any other modules that may depend on the change. Modules may be accessible over the web such that Plan Participants, Plan Administrators, and Plan Actuaries may access pension plan information from anywhere and at any time. Plan Actuaries may define plans and generate valuation reports while Plan Participants view their pension benefits and understand what benefits they will receive under a variety of scenarios.

The present invention allows Developer Actuaries to directly contribute to the code for administering the pension plan without requiring them to write a single line of it themselves. This result is accomplished by tools that support logic and calculations. A first tool—RuleBench—visually models logic that is stored in a database. A Developer Actuary may visually define the complex logic.behind functionality for pension plan definition, calculation sequencing, and report generation in which paragraphs are selected for inclusion in reports. In the calculation sequencing component of the RuleBench, rules may be defined to refer to one or more calculation objects in which complex calculations related to the plan are performed. At any point, the logical structure stored in the database may be converted into expert system code. The expert system code is in turn interpreted by an expert system shell/engine residing on a server. The generated expert system code supports benefit calculations and report generation.

A second tool—Calculation Designer—is used to design discrete calculation objects. One method of doing this is to use a standard client-based spreadsheet such as Microsoft® Excel. The calculation objects (e.g., spreadsheets) that are developed with the Calculation Designer may then be sequenced on a server in any manner as dictated by expert system code generated from the calculation sequencing component of the RuleBench. Data may be passed into the calculation objects from a database and/or from calculated results from other calculation objects and subsequently recalculated.

BRIEF DESCRIPTION OF THE DRAWINGS

FIG. 6 is a report framework tab of a RuleBench screen for a RuleBench component in accordance with an example embodiment of the present invention;

FIG. 7 is a plan definition screen for an example embodiment of a plan definition component in accordance with an example embodiment of the present invention;

FIG. 8 is a benefit summary present-retirement screen for an example embodiment of the present invention; and FIG. 9 is a benefit scenario results screen for an example embodiment of the present invention.

DETAILED DESCRIPTION OF THE INVENTION

Figure 1A:
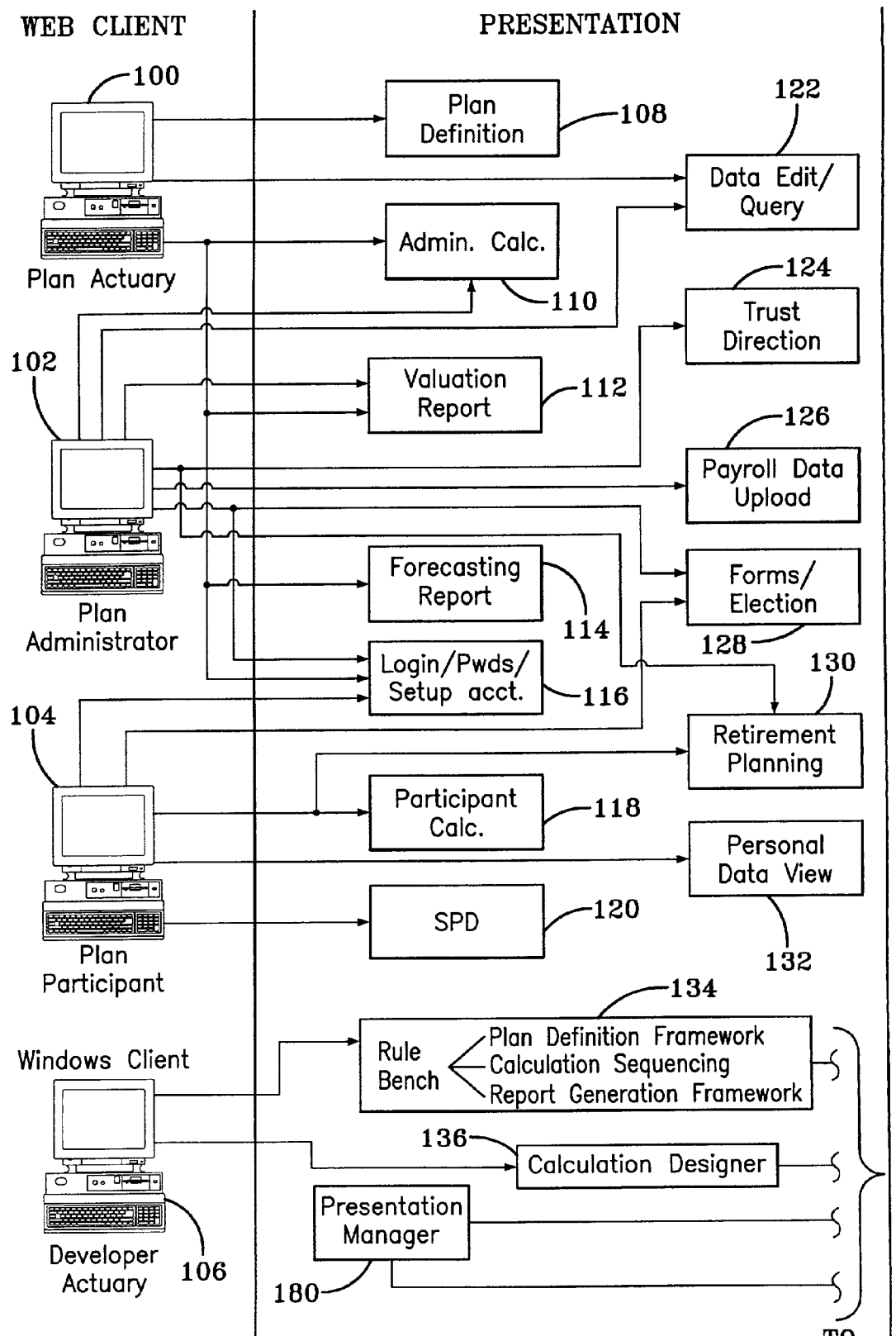
FIG. 1 is a block diagram of the primary components for an example embodiment of the present invention.
Figure 1B:
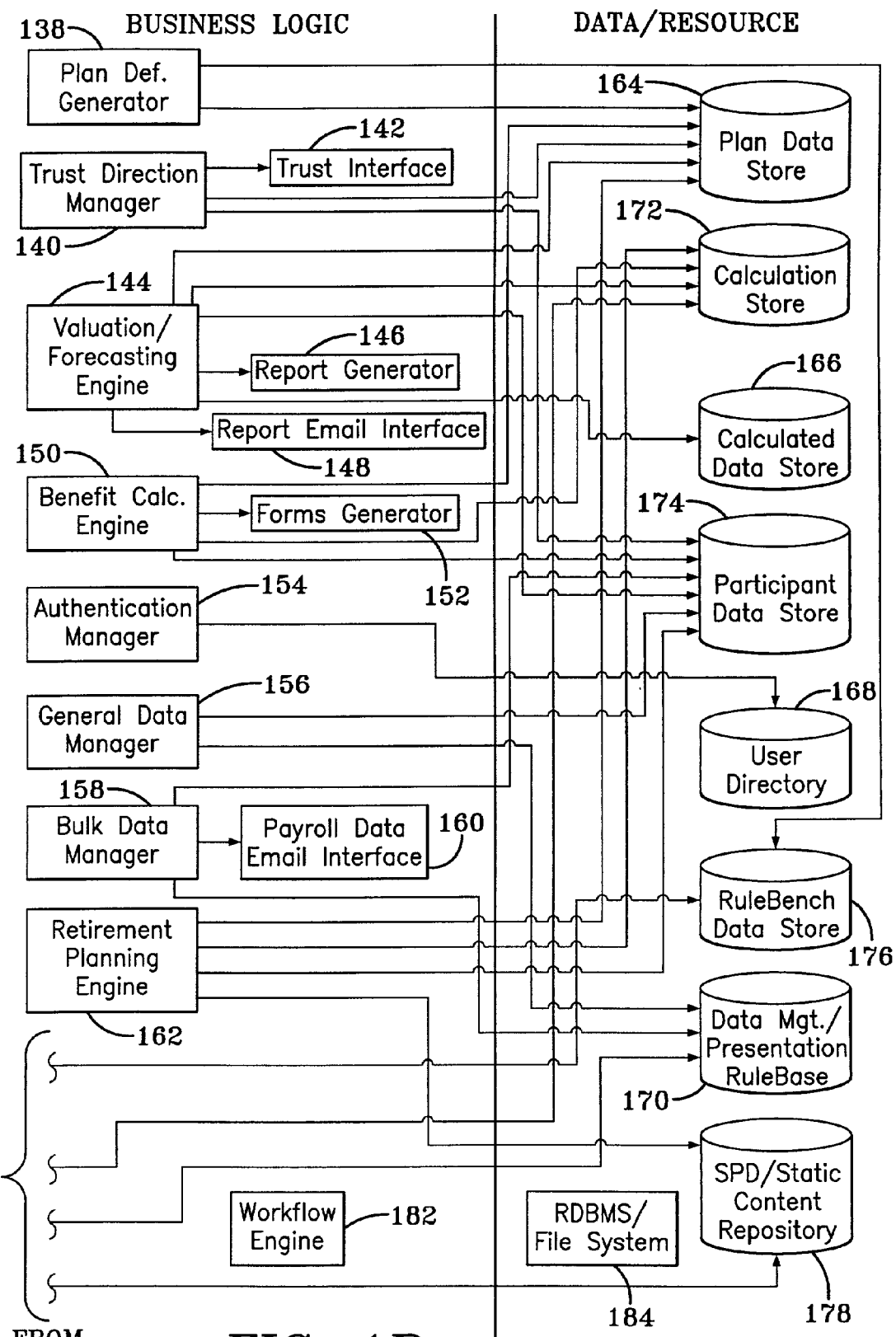

Referring to FIG. 1, a block diagram of the primary components for an example embodiment of the present invention is shown. Categories of users include the following:

Plan Actuary 100—An actuary hired by a company to oversee the management and administration of the pension plan. The Plan Actuary is typically responsible for defining the pension plan, running the valuation report, and certifying it.

Plan Administrator 102—An employee (typically working in an HR department) of a company that sponsors a pension plan. The Plan Administrator may run benefit calculations, etc for other employees and maintains the underlying database.

Plan Participant 104—An employee of a company and participant of the pension plan.

Plan Actuaries, Plan Administrators, and Plan Participants using a computer equipped with a browser may access a web site that provides certain features and functionality of the present invention.

Another category of user is the Developer Actuary 106. The Developer Actuary uses tools to design the framework of logic (RuleBench component 134) and calculation objects for calculation sequencing (Calculation Designer component 136) provided by the present invention so that Plan Actuaries 100 may define pension plans for their respective companies. The RuleBench component 134 may further comprise a plan definition framework component, a calculation sequencing component, and a report generation framework component. In an example embodiment of the present invention, the RuleBench component 134 and Calculation Designer component 136 may operate on a standalone computer (Microsoft® Windows Client 106). In an example embodiment of the present invention, the tools operate in conjunction with an expert system shell that provides the functionality defined by the Developer Actuary 106.

The plan definition framework component of the RuleBench component 134 may be used by a Developer Actuary 106 to develop a framework of logic comprising rules and questions that are used to configure presentation conditions and on-screen assistants (i.e., wizards). The rules that are created using the plan definition framework component of the RuleBench component 134 are stored in the RuleBench Data Store 176. The rules relate to a variety of aspects relevant to compliant pension plans. The on-screen assistants created and presented from rules defined using plan definition framework component of the RuleBench component 134 are used in the Plan Definition component 108 by a Plan Actuary 100 to define a plan for a company. The Plan Definition component 108 operates in conjunction with a Plan Definition Generator component 138 and RuleBench Data Store 176 to present the on-screen assistants to the Plan Actuary 108 according to the presentation conditions. Using an interview format, the Plan Actuary 100 communicates through the on-screen assistants and is prompted for answers to questions that relate to a plan. Each on-screen assistant may present one or more questions to a user. Only the questions that are necessary for the plan definition are asked. The answers that the Plan Actuary provides are used in determining which presentation conditions apply and which questions appear on subsequent on-screen assistants. The rules that are developed by the Developer Actuary 104 using the plan definition framework component of RuleBench component 134, therefore, define the sequence of questions that may be asked of the Plan Actuary 100 by the on-screen assistants and are defined so that only relevant questions are posed to the Plan Actuary 100. The plan definition developed by the Plan Actuary 100 in answering questions about the plan provisions is stored at the Plan Data Store 164.

The calculation sequencing component of the RuleBench component 134 may be used by a Developer Actuary 106 to develop a framework of logic for performing (sequencing) calculations defined in calculation objects. Calculations are performed according to the calculation sequence to generate valuation reports and perform benefit calculations for the plan and in connection with requests for information that may be initiated by different categories of users through the web.

The Calculation Designer component 136 may be used by a Developer Actuary 106 to develop calculation objects that contain the complex calculations that are required to support the plan definition. In an example embodiment of the present invention, the Calculation Designer component 136 is a visual tool (e.g., spreadsheet tool) that allows a Developer Actuary 106 to develop calculation objects that are sequenced according to calculation sequencing rules developed using the RuleBench component 134. In an example embodiment of the present invention in which calculation objects are spreadsheets, a calculation sequence is a sequence of rules to select spreadsheets. At runtime, the formulas in the spreadsheets fire as they are selected according to the rules defined by the Developer Actuary 106 using the calculation sequence component of the RuleBench component 134. A spreadsheet server such as the Actuate® e.spreadsheet server may be used at runtime to fire (perform or run) the calculation objects (e.g., spreadsheets) in the sequence specified by the Calculation Store 172.

Code that reflects the sequencing designed by the Developer Actuary 106 is generated and the calculation sequencing rule(s) or instruction code as well as the calculation objects may be stored in the Calculation Store 172. The calculation sequencing rules and calculation objects may be retrieved from the Calculation Store 172 by other components of the present invention to complete complex calculations that may be required to generate valuation reports or to perform benefit calculations.

The report generation framework component of the RuleBench component 134 may be used by a Developer Actuary 106 to develop a framework of logic for generating reports. Using the report generation framework component, the Developer Actuary may define report paragraphs and calculations that may be included in the different types of reports that are generated with the present invention.

The Administration Calculations component 110 may be used by the Plan Actuary 100 or Plan Administrator 104 to generate benefit summaries or benefit scenarios for Plan Participants. The Administration Calculations component 110 uses the Benefit Calculation Engine component 150 to complete the calculations. Data from the Plan Data Store 164 (plan definition), Participant Data Store 174 (Plan Participant data), and Calculation Store 172 is used by the Benefit Calculation Engine component 150 to complete the calculations.

After performing various administration calculations on behalf of a Plan Participant, the Plan Participant may elect to leave the company and take the benefit to which he or she is entitled. The Forms/Election component 128 allows the Plan Actuary 100 or Plan Administrator 104 to generate the forms that the Plan Participant is required to sign to take the benefit. The format and content of the forms are determined by the plan definition from the Plan Data Store 164.

The Valuation Report component 112 may be used by the Plan Actuary 100 or Plan Administrator 102 to generate financial and valuation reports that may be required by law. The Valuation Report component 112 prompts the user for information regarding the type of report to be generated and relevant report parameters such as date ranges or other plan details relevant to the report to be generated. The information provided by the user is used in conjunction with Valuation/Forecasting Engine component 144 and a Report Generator component 146 to generate the requested report. Portions of text that are associated with various types of reports that Plan Actuaries and Plan Administrators are required by law to generate may be developed by a Developer Actuary 106 using the report paragraph component of the RuleBench component 134 and stored in the RuleBench Data Store 176. The plan definition stored in the Plan Data Store 164 dictates which sections of report text appear in the final report and the calculations that are used to generate the financial information included in the final report. A Calculated Data Store 166 holds the data for the calculations that have been completed by the Valuation/Forecasting Engine component 144 (e.g., accrued and projected benefits, vesting status, services, etc.). A Report Email Interface component 148 may be used to send the report to selected recipients (e.g., the Plan Actuary 100 who has requested the report).

The Forecasting Report component 114 may be used by the Plan Actuary 100 or Plan Administrator 102 to generate forecasting reports. The Forecasting Report component 114 prompts the user for relevant report parameters. The information provided by the user is used in conjunction with the Valuation/Forecasting Engine component 144 and a Report Generator component 146 to generate the requested forecasting report.

An important and unique aspect of the present invention is that calculations performed in generating valuation reports are certifiable. Valuation reports and other financial reports for pension plans must be certified by an actuary who can confirm that the plan is compliant with the various laws and regulations that govern pension plans. Using prior art methods, certifiable valuation reports may take months to generate because an actuary must manually gather the relevant data and perform many of the calculations that are required to confirm the plan's compliance. Using the present invention, the Valuation/Forecasting Engine component 144 uses calculation sequences developed by the Developer Actuary 106 using the Calculation Designer 136 to automatically perform the needed calculations.

The Data Edit/Query component 122 allows Plan Actuaries 100 and Plan Administrators 102 to edit or query data related to Plan Participants that may affect various calculations that are performed. The Data Edit/Query component 122 operates in conjunction with the General Data Manager component 156 to provide access to the Participant Data Store 174 and Data Management/Presentation Rulebase 170. The General Data Manager component 156 performs a variety of data integrity checks to ensure that data used for plan calculations is accurate. The user is given the option of correcting the data before proceeding. In some instances, the data discrepancy is not significant, and the user may choose to override the data discrepancy and proceed with the calculations. Examples of errors that may be detected are discrepancies in a Plan Participant's personal data such as a decrease in salary from one year to the next or an employment start date that is earlier than the Plan Participant's birth date.

An error checking routine applied to the entire database flags potential errors. They may be queried to quickly locate and correct errors. Errors that are corrected result in elimination of the error flag. If certain data is assumed, this fact may be noted. If an error flag appears but the data is actually correct, this fact may also be noted. Error checking may be performed whenever the database is changed (e.g., when new data is submitted through payroll or when an individual record is changed). If a record is accessed, the list of potential errors is illustrated. Once again, these errors may be corrected, assumed data may be added and noted as such, or the system may be told that the data showing the potential error is actually correct. "Fatal" errors exclude a record from consideration on a valuation run, benefit calculation, or other such calculated item.

The Trust Direction component 124 operates in conjunction with the Trust Direction Manager component 140 and Trust Interface component 142 to allow a Plan Actuary 100 or Plan Administrator 102 to communicate with a plan trustee who is responsible for distributing benefits to Plan Participants. The Trust Direction component 124 allows the user to enter instructions related to cutting checks, distributing and managing plan funds, etc.

The Payroll Data Upload component 126 operates in conjunction with the Bulk Data Manager component 158 and Payroll Data Email Interface component 160 to upload payroll data.

The Login/Password/Setup account component 116 may be used by a Plan Actuary 100 or Plan Administrator 102 to establish accounts for users of the system including Plan Participants. In an example embodiment of the present invention, accounts for Plan Participants are self-activating. Personal information for each Plan Participant (e.g., contact information, salary information, etc.) is loaded in the Participant Data Store 174 and user data is loaded in the User Directory 168. Plan Participants who wish to establish an account so that they may access plan data through the web complete a simple procedure to activate their accounts. For example, the account may be activated when a participant provides a social security number and creates a password. They are not required to enter the contact and other information that is needed to perform benefit calculations and benefit scenarios on their behalf. The Authentication Manager component 154 controls user access to the system in accordance with user data in the User Directory 168.

The Participant Calculations component 118 may be accessed by Plan Participants so that they may review personal information, plan summary information, and a retirement planning calculator. The calculations that may be performed include benefit summaries and benefit scenarios related to retirement benefits, death benefits, and disability benefits.

A Plan Participant 104 may enter parameters relating to various benefit scenarios and obtain an immediate response indicating the benefit to which the participant is entitled under the scenario. For example, the participant may inquire about the benefit to which he or she would be entitled at retirement ages of 55, 60, and 65. In another example, the participant may inquire about the benefit to which he or she would be entitled for a retirement age of 60 and salary increases of 5% every year until retirement age.

The Benefit Calculation Engine component 150 performs the complex calculations using data from the Plan Data Store 164 (the plan definition), the Calculation Store 172 (calculations for the defined plan), and Participant Data Store 174 (participant's salary history, etc.). If the Plan Participant decides to take advantage of the benefit, he or she may request the appropriate forms to be signed. The Forms/Election component 128 allows the Plan Participant to generate the necessary forms. The format and content of the forms are determined by the plan definition from the Plan Data Store 164.

The Retirement Planning component 130 may be used by a Plan Participant. It considers the pension plan, any defined contribution plans, social security, and other retirement income or savings in performing calculations for the benefit of the Plan Participant. The Retirement Planning component 130 projects retirement income expected and provides a plan to reach targets. The information needed by the Retirement Planning component 130 may be obtained from the Plan Participant through an interview process.

The Summary Plan Definition (SPD) component 120 allows a Plan Participant 104 to see a summary of the pension plan. The summary may be obtained from the SPD/Static Content Repository 178.

Other components that operate to provide the features and functionality of the present invention are the Presentation Manager component 180 (to manage the presentation of screens to users), a Workflow Engine component 182 (to manage user interactions between components), and a Relational Database Management System/File System component 184 (to manage interactions with data stores and files). The Presentation Manager component 180 operates in conjunction with the Data Management/Presentation Rulebase 170 and SPD/Static Content Repository 178.

Figure 2:
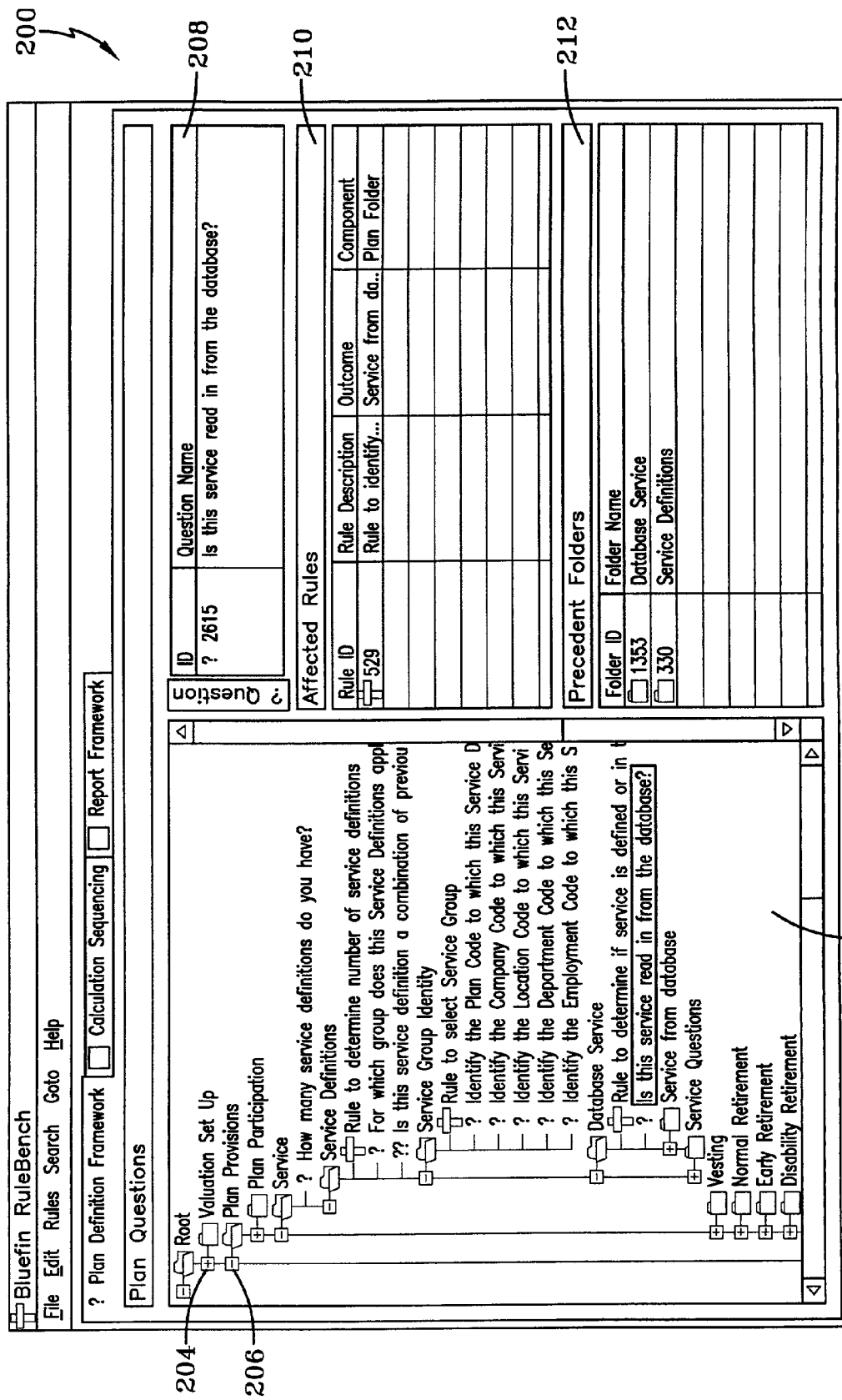
FIG. 2 is a plan definition framework tab of a RuleBench screen for a RuleBench component in accordance with an example embodiment of the present invention.

Referring to FIG. 2, the plan definition framework tab of a RuleBench screen 200 for a RuleBench component in accordance with an example embodiment of the present invention is shown. The plan definition framework may be designed and created by a Developer Actuary. The plan definition framework screen 200 comprises an organizational section 202 that displays the three main elements for defining the plan definition framework:

Folders which are used to contain and organize other elements within the same category;

Question elements that may be presented to a Plan Actuary 100 through the Plan Definition Generator 138 in a variety of formats; and Rule elements which describe conditions that questions must meet in order to be presented (presentation conditions).

As shown in the organizational section 202, folders related to the plan definition framework are organized hierarchically in a series of folders. In an example embodiment of the present invention, top-level folders may relate to valuation setup 204 and plan provisions 206. Each top-level folder may comprise one or more sub-folders, and each sub-folder may comprise additional folders. For example, within the plan provision folder 206, sub-folders of plan participation, service, vesting, normal retirement, early retirement, disability retirement, delayed retirement, salary, and benefits formulas may be created. Within the salary sub-folder, salary definitions and annualized salary folders may be defined. The Developer Actuary has full control over the hierarchy of folders and may define as many folders and sub-folders as are necessary to obtain from users the information that is needed to define the complete plan. In addition, the Developer Actuary can add and remove rules and related questions from folders and sub-folders as needed. Questions within a given folder are presented to a Plan Actuary 100 through the Plan Definition Generator 138 if the condition for each rule within that folder has been met as well as those for each of the other folders that is inherited by virtue of its location inside the hierarchy.

The question section 208 shows the name and identification number of a highlighted element that has been highlighted in the organizational section 202. The affected rules section 210 shows which rules are dependent upon the highlighted element in section 202. The precedent folders section 212 shows the inherited folders from organizational section 202.

Figure 3:
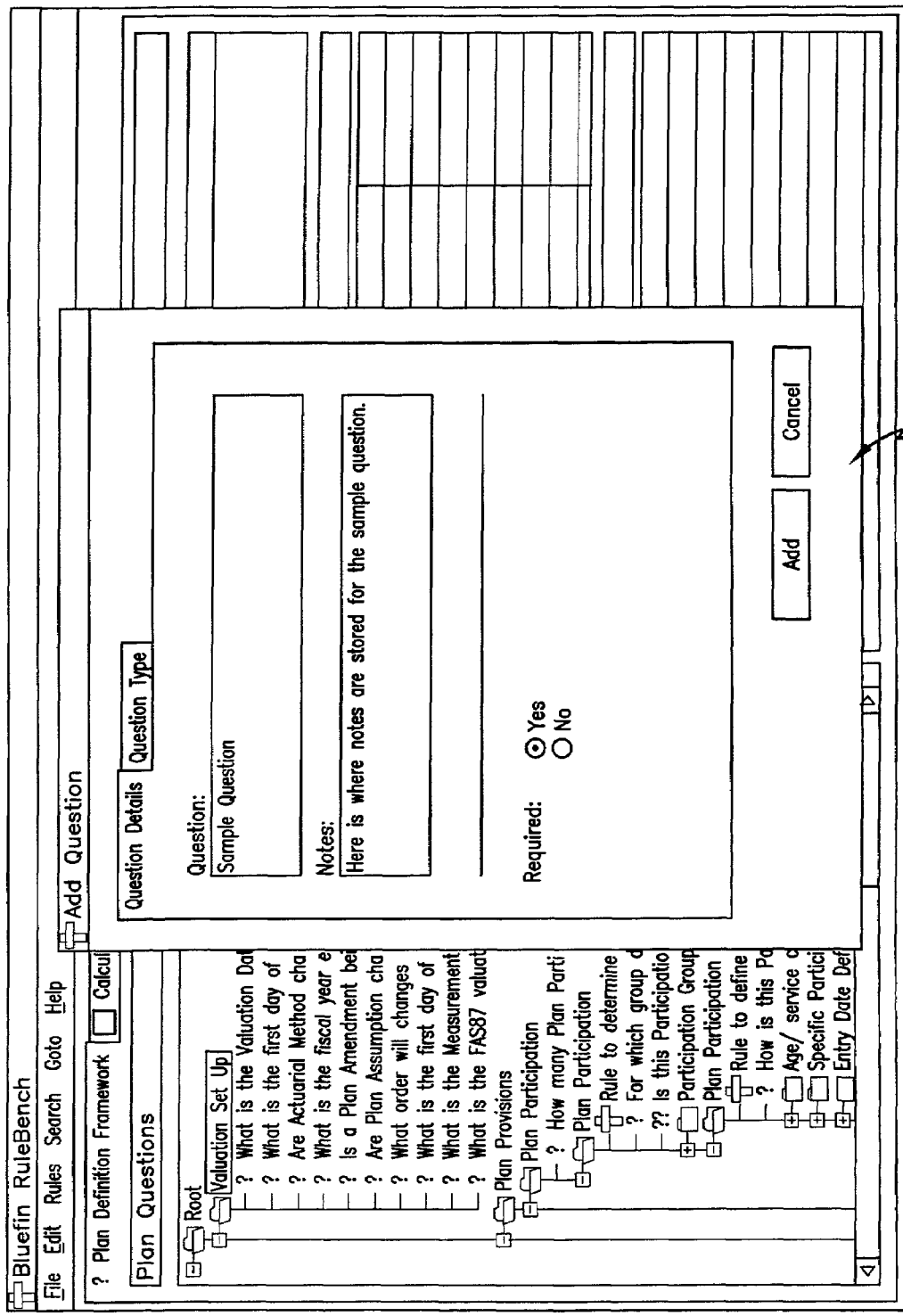
FIG. 3 is an add question screen of a RuleBench screen for a RuleBench component in accordance with an example embodiment of the present invention.
Figure 4:
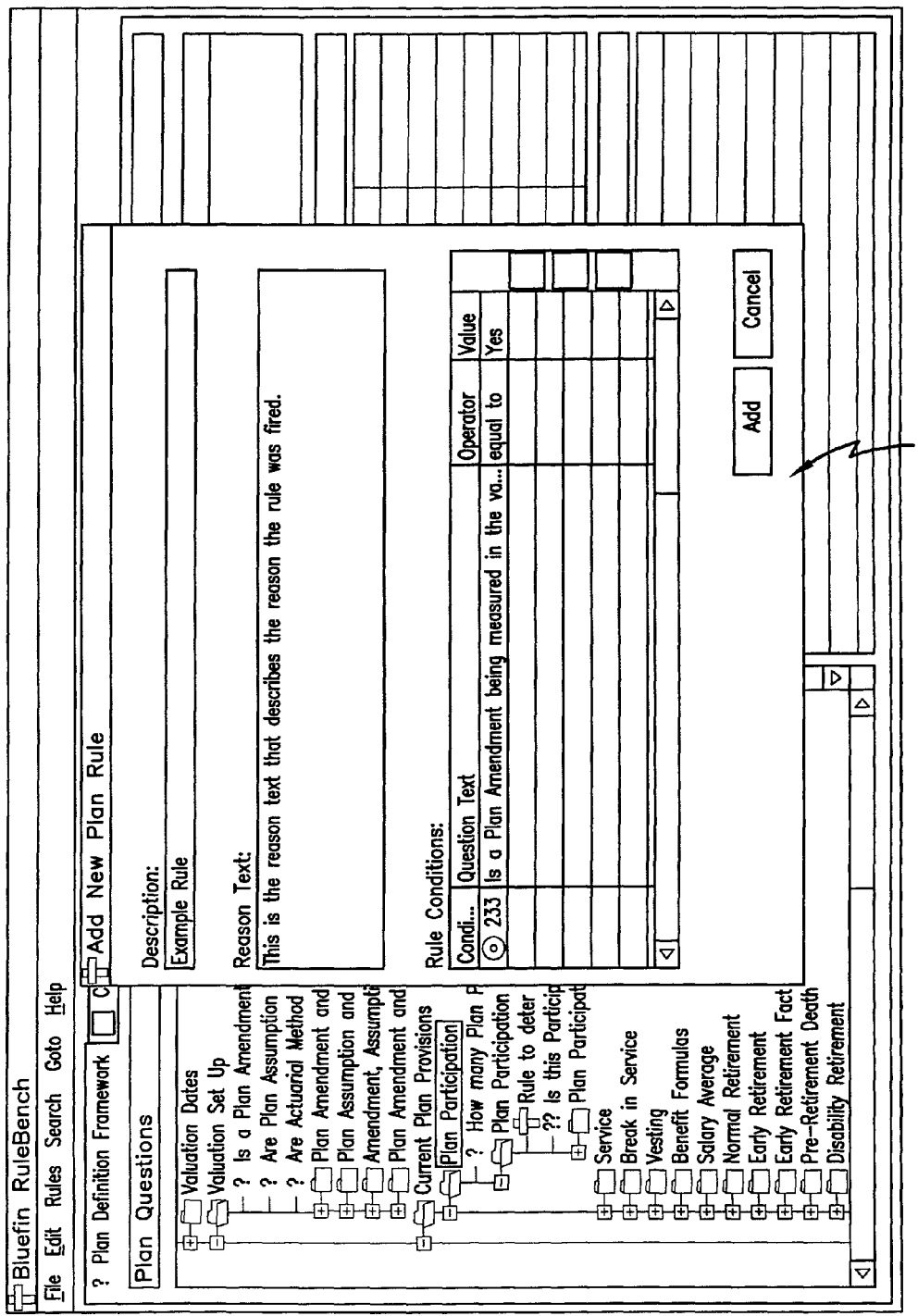
FIG. 4 is an add new plan rule screen of a RuleBench screen for a RuleBench component in accordance with an example embodiment of the present invention.

A Developer Actuary has the ability to add or modify questions or rules (presentation conditions) for the plan definition framework at any time as shown by FIGS. 3 and 4. Referring to FIG. 3, an add question screen 300 for an example embodiment of the present invention is shown. A Developer Actuary may enter question details such as question text and notes that relate to the question. In addition, the Developer Actuary may specify whether a question is required or optional. The Developer Actuary may also specify a question type. The question type indicates how the question is presented to the Plan Actuary during plan definition. Some questions may require input from the Plan Actuary (e.g., a date). In other instances, the Plan Actuary may be able to select an answer from a list of answers applicable to the question by scrolling through the appropriate answers or by selecting a button associated the appropriate answer.

Referring to FIG. 4, an add new plan rule screen 400 for an example embodiment of the present invention is shown. With the add new plan rule screen, the Developer Actuary may define the presentation conditions that apply to a selected question. The Developer Actuary may specify a description of the rule, a reason for the rule (Reason Text), and rule conditions (Rule Conditions). Each rule condition may have a condition identifier, the text of the question to which the rule applies, an operator, and related value. Examples of operators include "equal to," "greater than," and "less than." Comparison values may relate to values for answers to questions that were answered by a Plan Actuary previously. The answer values may relate to responses regarding time as well as replies of "yes" or "no."

Figure 5:
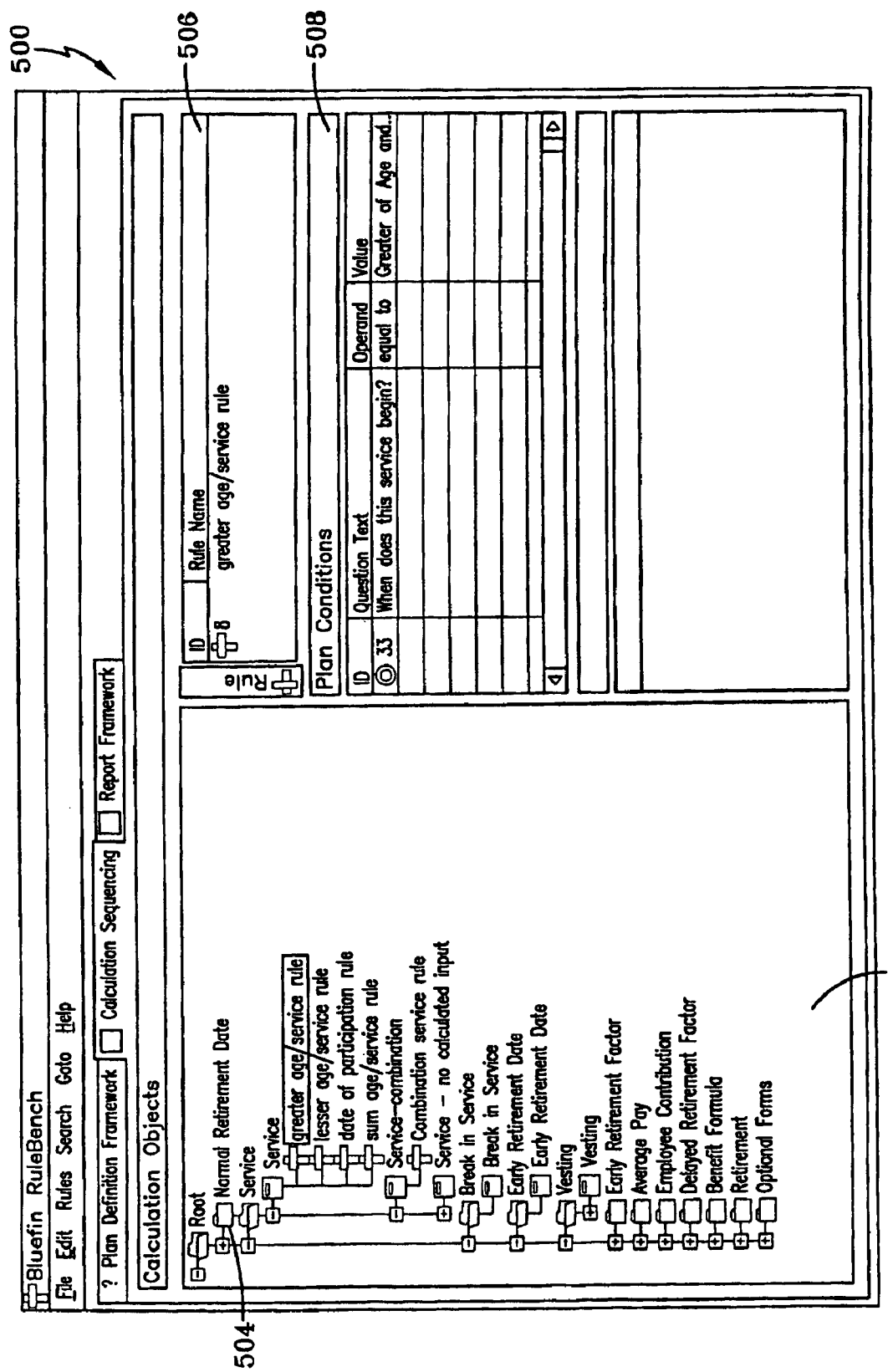
FIG. 5 is a calculation-sequencing tab of a RuleBench screen for a RuleBench component in accordance with an example embodiment of the present invention.

Referring to FIG. 5, a calculation-sequencing tab of a RuleBench screen in accordance with an example embodiment of the present invention is shown. In calculation sequencing, the Developer Actuary may select calculation objects and define the rules that apply to them when they are run as part of a benefit calculation or valuation report. Calculations are discrete and are performed in a sequence to generate valuation reports and benefit calculations for the plan and in connection with requests for information that may be initiated through the web. For example, Plan Actuaries may submit requests for benefit calculations using specific participant data. In addition, Plan Participants may submit requests for benefit calculations based on their own unique situations and employment histories. Different kinds of calculations are often used for different plans. The calculations sequencing component of the RuleBench allows the Developer Actuary to define the calculations that apply to the defined plan and in what sequence they are used.

The calculation sequencing screen 500 comprises an organizational section 502 that displays the three main elements for defining the sequence of calculations:

Folders which are used to contain and organize other elements within the same category;

Discrete calculation objects that are defined using the Calculation Designer; and Rules that describe conditions that apply to the calculation object.

As shown in the organizational section 502, calculation objects are organized hierarchically in a series of folders. In an example embodiment of the present invention, top-level categories of calculation objects relate to Normal Retirement Date 504, Service, Break in Service, Early Retirement Date, and Vesting. Each top-level folder may comprise one or more sub-folders, and each sub-folder may comprise additional folders. For example, within the Service folder, a sub-folder may be created. The Developer Actuary has full control over the calculation object hierarchy and may define as many folders and sub-folders as are necessary to perform calculations based on user requests for benefits information and report generation. In addition, the Developer Actuary may add and remove calculation objects from folders and sub-folders as needed.

The rule section 506 shows the identification number and name of a rule that is associated with a selected calculation object. The Plan Conditions section 508 shows which questions are associated with the selected calculation object. The Plan Conditions may comprise an identifier for a question, question text, and operand and values indicating when the calculation of the calculation object applies to the displayed question.

Referring to FIG. 6, a report framework tab of a RuleBench screen for a Report Generator component in accordance with an example embodiment of the present invention is shown. The Developer Actuary may define report paragraphs and calculations that may be included in the different types of reports that are generated with the present invention. As indicated in FIG. 6, with the report framework screen 600 the paragraphs are organized in report format. For example, report headers 602 may be defined and individual paragraphs may be defined. Individual paragraphs may relate to a title page 604 or parts of the report 606. In the question section 608, the Developer Actuary may associate questions with the individual report paragraphs, and in the report rules section 610, identify the rules that apply. The plan definition developed by the Plan Actuary determines which report paragraphs are selected individually to be included in a generated report.

An expert system code generator uses the output of the plan definition framework component, calculation sequencing component, and report framework component to generate code for the features and functionality of the present invention. The code provides the features and functionality available to the Plan Actuaries, Plan Administrators, and Plan Participants over the web. When the Developer Actuary changes the plan definition framework, calculation sequencing, or report framework, new code reflecting the changes may be generated and made available. JAVA Expert System Shell (JESS) is an example of an example of an expert system shell that may be used to execute the expert system code generated by the present invention.

Plan Actuaries may access the system and method of the present invention to perform a variety of tasks. A Plan Actuary page is displayed when a user recognized as a Plan Actuary logs in. Typically, in addition to Plan Actuary functions, Plan Administrator functions are also available to Plan Actuaries. Additionally, the Plan Actuary may define a plan and generate actuarial valuation reports.

Referring to FIG. 7, a plan definition screen for an example embodiment of a plan definition component in accordance with an example embodiment of the present invention is shown. Within the various categories of questions that relate to pension plan definitions, the Plan Actuary is presented with questions to be answered. For example, in the Valuation Set Up category 700, questions related to the valuation date 702, first day of the plan year 704, actuarial method changes 706, fiscal year end for contributions 708, and measuring of plan amendments may be asked. In addition to viewing the plan definition in a question format, the Plan Actuary may view the plan definition in an outline format 712 that shows the various categories and sub-categories (i.e., folders) of questions in the plan.

An authorized Plan Actuary may set up a plan or modify it under the plan definition component. All plan provisions (including details like rounding rules) are captured through an intelligent interview process. The Plan Actuary is prompted for answers to questions about the provisions of the plan. By answering the questions that are posed, the Plan Actuary may define a limitless series of provisions that identify exactly the specific plan that applies to the company. If necessary, provisions may be defined differently for each Plan Participant. Plan assumptions and methods are also included, as well as previous year valuation results and asset information. All the input is aggregated and the valuation/reporting engine and the benefit calculation engine are run with the output being unique to the provisions of a given pension plan.

Once the plan definition is entered, and the company database (e.g., plan participant data, payroll data, etc.) has been loaded, all information needed for a valuation is available. If changes need to be measured (such as plan amendments, assumption changes, or method changes), the Plan Actuary may define the order in which these items are valued. The valuation/reporting engine then measures the changes and generates the valuation report. Plan liabilities are calculated directly without shortcuts. Pre-retirement death after termination or disability is included. Data for any number of Plan Participants may be included in the valuation with details to verify results. Individual calculated liabilities, benefits, etc. are stored in a database and may be queried to assist in the Plan Actuary's review. After completion, the valuation report is emailed to the Plan Actuary.

Plan Administrators may also access the system and method of the present invention to perform a variety of tasks. A Plan Administrator page is displayed when a user recognized as a Plan Administrator logs in. Typically, the tasks that Plan Administrators perform include benefit calculation/projection capabilities for each benefit type (retirement, disability, pre-retirement death, etc.), data management, financial reporting, and trust payment direction.

The Plan Administrator may perform benefit calculations for any participant in the plan. The Plan Administrator selects the participant using a search engine and then selects a benefit type. A summary page similar to the summary provided for Plan Participants is shown. If a specific calculation or projection is needed, all of the pertinent data is displayed and may be changed for purposes of completing the desired calculation. The output is similar to the information provided for Plan Participants. Additional scenarios may be calculated or forms may be generated that are specific to each calculation. For example, if a retirement calculation is performed, the forms that are generated are those needed for the participant to retire. If a vested terminated calculation is performed, a notice of vested benefits is generated.

In an example embodiment of the present invention, when a benefit type is accessed (e.g., retirement benefits), a summary is provided illustrating four different benefits. The summary illustrates four different benefits. An accrued benefit is calculated. Two early retirement benefits are calculated and the normal retirement benefit is calculated. Any future benefits are determined initially using a 0% future salary increase assumption. The Plan Participant may change this assumption and the same four benefits are then calculated using the input salary increase assumption. The benefits are shown in the normal form of payment under the plan. Referring to FIG. 8, a benefit summary-retirement screen for an example embodiment of the present invention is shown.

For a specific benefit projection, the user may provide a date of termination, date of retirement, salary increase assumption, spouse/beneficiary birth date, and any other plan specific item needed (for example, if social security level options are permitted under the plan, a social security retirement date is requested so that this option may be calculated). The benefit is then calculated based upon these inputs. Optional forms of payment are also illustrated. If the scenario supplied by the Plan Participant is not valid, a message is displayed indicating that the input is not valid or the input will be revised (for example, if a payment date is prior to a termination date, the payment date is adjusted to reflect the termination date). On the output page, the scenario input used in the calculation is displayed. The user may then choose to project another scenario or may move on to another function. Referring to FIG. 9, a benefit scenario results screen for an example embodiment of the present invention is shown.

Plan Administrators may also perform data management tasks. The present invention maintains a complete pension database. All applicable data elements necessary to determine benefits for Plan Participants are stored. Plan codes, company codes, location codes, employment codes, department codes, etc., are available to help identify various groups. Addresses, beneficiary data, benefit elections, retirement check deductions, tax information, etc. is included. Inactive participant information is stored. In addition, many calculated items such as accrued and projected benefits, vesting status, services, etc., are also stored.

The Plan Administrator has the ability to query the databases for any data element(s) or to produce any reporting needed for participant notification, etc. Data items are selected to define the group for the query and then the data elements to be listed in the output are identified. Alternatively, the Plan Administrator may review/edit the data for one participant. The Plan Administrator also has the ability to download data.

The Plan Administrator has the ability to project up to three years of contributions and financial statement expenses for different interest rate and asset return assumptions the user selects. These projections may be executed assuming no other gains or losses (other than interest rate and asset return changes). The basis for these projections is the last valuation that was completed.

Plan Participants may also access the system and method of the present invention to perform a variety of tasks. The Plan Participant may access a summary plan description or any other plan summary. Links to specific terms in the summary may provide additional definitions and more detailed explanations regarding the plan.

A Plan Participant may perform retirement planning tasks using the retirement planning component which considers the pension plan, any defined contribution plans, social security, and other retirement income or savings to project retirement income expected and provide a plan to reach targets. The information needed by the retirement planning component may be obtained from the Plan Participant through an interview process. A Plan Participant may request a "retirement package" by inputting data similar to that requested in the retirement scenario projection. This response to the request includes all forms necessary to effect retirement.

Multiple companies may take advantage of the present invention. The modular design and implementation supports the customization of the presentation functionality so that a company logo or identifier is associated with each screen the user sees. The security and authorization mechanisms that are employed ensure that only the functions authorized for use by a particular user may be accessed. The system and method automatically associates each user with the correct pension plan and displays only information that is applicable to the plan and the user's authorization.

The present invention is a web-based system and method that provides real-time pension plan administration for Plan Actuaries, Plan Administrators, and Plan Participants. Reports and calculations that now take weeks or months to generate may be performed instantly with the present invention. Because employee information is updated when plan definitions change or payroll data is updated, results are always current. Users may perform an unlimited number of calculations, reports, and transactions resulting in significantly lower administration costs. Any company that has a pension plan may benefit from using the system and method of the present invention.

While particular embodiments of the invention have been illustrated and described in accordance with pension planning, various modifications and combinations can be made without departing from the spirit and scope of the invention, and all such modifications, combinations, and equivalents are intended to be covered and claimed.

What is claimed is:

1. A computerized system for designing pension plan logic and calculations for use by a computer user to create a defined benefit pension plan comprising:
    a plan definition component configured to receive data for questions used in querying said computer user to define provisions of said defined benefit pension plan and for presentation conditions for presenting said questions to said computer user;
    a calculation designer component configured to receive in a plurality of spreadsheets a plurality of actuarial formulas for performing calculations suitable to implement said provisions for said defined benefit pension plan;
    a calculation sequencing component configured to receive data for a calculation sequence to select said spreadsheets and execute said actuarial formulas in said spreadsheets, said data comprising:
        (a) rules for selecting said spreadsheets and executing said actuarial formulas; and
        (b) plan conditions associating responses to said questions from said plan definition component with said spreadsheets;
    a spreadsheet component configured to store said plurality of spreadsheets for execution according to said calculation sequence;
    a first database for storing said questions, said presentation conditions, and said data for said calculation sequence to select said spreadsheets and execute said actuarial formulas; and
    a code generation component for generating executable code for presenting said questions in accordance with said presentation conditions, providing the responses to said questions to said spreadsheets in accordance with said plan conditions, causing said spreadsheets to be selected and to execute said actuarial formulas in accordance with said rules for selecting said spreadsheets and executing said actuarial formulas and the responses to said questions provided by said computer user, thereby defining the provisions of the defined benefit plan consistent with designed pension plan logic.

2. The system of claim 1 wherein said code generation component is further for generating executable code for populating said actuarial formulas with plan participant data.

3. The system of claim 1 further comprising a valuation report paragraph component configured to receive data for defining text of valuation report paragraphs, defining rules for selecting calculation calculation sequences for said valuation report, and defining rules for selecting said valuation report paragraphs.

4. The system of claim 3 wherein said code generation component is further for generating executable code for generating a valuation report using said provisions of said defined benefit pension plan, said valuation report paragraphs, said selected calculation sequences for said valuation report, and said rules for selecting said valuation report paragraphs.

5. The system of claim 1 wherein said code generating component is further for generating executable code for accessing data for a plurality of plan participants and performing benefit calculations comprising benefit summaries and benefit scenarios for the plurality of plan participants.

6. A computerized method for designing pension plan logic and calculations for use by a computer user to create a defined benefit pension plan comprising:
    receiving by a computer questions for use in querying said computer user to define provisions of said defined benefit pension plan and for
    receiving by said computer presentation conditions for presenting said questions to said computer user;
    receiving by the computer in a plurality of spreadsheets a plurality of actuarial formulas for performing calculations suitable to implement said provisions of said defined benefit pension plan;
    receiving by said computer data for a calculation sequence to select said spreadsheets and execute said actuarial formulas in said spreadsheets, said data comprising:
        (a) rules for selecting said spreadsheets and executing said actuarial formulas; and
        (b) plan conditions associating responses to said questions with said spreadsheets;
    storing in a first database said defined benefit pension plan questions, said presentation conditions, said spreadsheets comprising said actuarial formulas, and said calculation sequences for selecting said spreadsheets; and
    generating executable code for presenting said questions in accordance with said presentation conditions, providing the responses to said questions to said spreadsheets in accordance with said plan conditions, causing said spreadsheets to be selected and to execute said actuarial formulas in accordance with said rules for selecting said spreadsheets and executing said actuarial formulas and the responses to said questions provided by said computer user, thereby defining the provisions of the defined benefit plan consistent with designed pension plan logic.

7. The method of claim 6 wherein said generating executable code further comprises generating executable code for populating said actuarial formulas with plan participant data.

8. The method of claim 6 wherein said generating executable code further comprises generating executable code for populating at least one actuarial formula with results from another actuarial formula.

9. The method of claim 6 wherein said generating executable code further comprises generating code for completing benefit summaries and benefit scenarios for a plurality of plan participants.

10. A computerized system for designing pension plan logic and calculations for use by a computer user to create a defined benefit pension plan comprising:
    a calculation designer configured to receive in a plurality of spreadsheets a plurality of actuarial formulas for performing calculations suitable to implement provisions for said defined benefit plan;
    a rulebench component configured to receive data for:

a) questions used in querying said computer user to define provisions of said defined benefit pension plan and presentation conditions for presenting said questions to said computer user;
  b) a calculation sequence to select said spreadsheets and execute said actuarial formulas in said spreadsheet;
  c) plan conditions associating responses to said questions with said spreadsheets a spreadsheet component configured to store said plurality of spreadsheets for execution according to said calculation sequence;

a database for storing said questions, said presentation conditions, and said calculation sequence to select said spreadsheets and execute said actuarial formulas; and a code generation component for generating executable code for presenting said questions in accordance with said presentation conditions, providing the responses to said questions to said spreadsheets in accordance with said plan conditions, causing said spreadsheets to be selected and to execute said actuarial formulas in accordance with said rules for selecting said spreadsheets and executing said actuarial formulas and the responses to said questions provided by said computer user, thereby defining the provisions of the defined benefit plan consistent with designed pension plan logic.

11. The system of claim 10 wherein said code generation component is further for generating executable code for populating said actuarial formulas with plan participant data.

12. The system of claim 10 wherein said code generation component is further for generating executable code for benefits calculations comprising benefit summaries and benefit scenarios for at least one plan participant.

13. The system of claim 10 wherein said code generation component is further for generating executable code for populating at least one actuarial formula with results from another actuarial formula.

14. The system of claim 10 wherein said questions and calculation sequences in said rulebench component are organized in a folder hierarchy.

15. The system of claim 10 wherein said provisions for said defined benefit plan are selected from the group consisting of plan participation, service, vesting, normal retirement, early retirement, disability retirement, delayed retirement, salary, benefits, valuation date, first day of plan year, actuarial method change, fiscal year end, measuring of plan amendments, and rounding rules.

16. The system of claim 1 wherein said code generation component is further for generating executable code for populating at least one actuarial formula with results from another formula.

17. The system of claim 1 wherein said provisions for said defined benefit plan are selected from the group consisting of plan participation, service, vesting, normal retirement, early retirement, disability retirement, delayed retirement, salary, benefits, valuation date, first day of plan year, actuarial method change, fiscal year end, measuring of plan amendments, and rounding rules.

18. The method of claim 6 wherein said provisions for said defined benefit plan are selected from the group consisting of plan participation, service, vesting, normal retirement, early retirement, disability retirement, delayed retirement, salary, benefits, valuation date, first day of plan year, actuarial method change, fiscal year end, measuring of plan amendments, and rounding rules.

* * * * *

UNITED STATES PATENT AND TRADEMARK OFFICE
CERTIFICATE OF CORRECTION

PATENT NO.       : 7,613,641 B1                                            Page 1 of 1
APPLICATION NO. : 10/152516
DATED            : November 3, 2009
INVENTOR(S)      : Jenkins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1488 days.

Signed and Sealed this

Nineteenth Day of October, 2010

David J. Kappos
*Director of the United States Patent and Trademark Office*